United States Patent
Sim et al.

(10) Patent No.: US 9,017,835 B2
(45) Date of Patent: Apr. 28, 2015

(54) SECONDARY BATTERY

(75) Inventors: Se-Sub Sim, Yongin-si (KR); Susumu Segawa, Yongin-si (KR); Eui-Jeong Hwang, Yongin-si (KR); Jong-Woon Yang, Yongin-si (KR); Han-Seok Yun, Yongin-si (KR); Beom-Gyu Kim, Yongin-si (KR); Jin-Wan Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 543 days.

(21) Appl. No.: 12/917,276

(22) Filed: Nov. 1, 2010

(65) Prior Publication Data
US 2011/0129697 A1    Jun. 2, 2011

Related U.S. Application Data (60) Provisional application No. 61/265,840, filed on Dec. 2, 2009.

(51) Int. Cl.
*H01M 14/00* (2006.01)
*H01M 2/02* (2006.01)
*H01M 6/50* (2006.01)
*H01M 10/48* (2006.01)

(52) U.S. Cl.
CPC .......... *H01M 2/0202* (2013.01); *H01M 6/5044* (2013.01); *H01M 10/488* (2013.01)

(58) Field of Classification Search
None
See application file for complete search history.

(56) References Cited

U.S. PATENT DOCUMENTS

| | | |
|---|---|---|
| 2003/0226897 A1 | 12/2003 | Jones et al. |
| 2008/0118825 A1 | 5/2008 | Yoon |
| 2008/0289861 A1 | 11/2008 | Lee |
| 2009/0123816 A1 | 5/2009 | Jang |
| 2011/0129697 A1 | 6/2011 | Sim et al. |

FOREIGN PATENT DOCUMENTS

| | | |
|---|---|---|
| CN | 101192658 A | 6/2008 |
| EP | 2061105 A1 | 5/2009 |
| EP | 2 330 655 A1 | 6/2011 |
| JP | 07-098279 A | 4/1995 |

(Continued)

OTHER PUBLICATIONS

Machine translation of Takuya JP 2005-135771 obtained from the JPO website.*

(Continued)

*Primary Examiner* — Sarah A Slifka
(74) *Attorney, Agent, or Firm* — Knobbe, Martens, Olson & Bear, LLP (57) ABSTRACT

A secondary battery includes a protection circuit module (PCM) electrically connected to a bare cell. The bare cell is wrapped with a first sheet, a water permeable second sheet placed on the first sheet, and a submergence label placed between the first sheet and the water permeable second sheet. The submergence label indicates if the bare cell has been exposed to moisture. The label sheet further has a stacking structure, wherein the second sheet is placed on top of the first sheet and the submergence label is interposed between the first sheet and the second sheet. Accordingly, it is possible to determine whether a user has disassembled, modified, or reused the battery and it is possible to easily verify whether or not the secondary battery has been submerged in a liquid due to a user's carelessness or mistake.

11 Claims, 8 Drawing Sheets

(56) References Cited

FOREIGN PATENT DOCUMENTS

| | | |
|---|---|---|
| JP | 11-144695 A | 5/1999 |
| JP | 2000-090896 A | 3/2000 |
| JP | 2005-010525 A | 1/2005 |
| JP | 2005-135771 | 5/2005 |
| JP | 2005-135771 A | 5/2005 |
| JP | 2006-011050 | 1/2006 |
| JP | 2009-123700 A | 6/2009 |
| JP | 2009-527106 A | 7/2009 |
| KR | 10-2009-0049184 A | 5/2009 |
| WO | WO 03/030079 A2 | 4/2003 |
| WO | WO 03/056408 A2 | 7/2003 |
| WO | WO 2007/094614 A1 | 8/2007 |

OTHER PUBLICATIONS

Machine translation of Toru JP 2006-011050 obtained from the JPO website.*

European Search Report, dated Dec. 22, 2010, for EP Application No. 10186746.3.

Japanese Office Action dated Sep. 4, 2012 for Japanese Patent Application No. JP 2010-264985 which claims priority from U.S. Appl. No. 61/265,840 and captioned U.S. Appl. No. 12/917,276.

Chinese Office Action dated Dec. 5, 2013 for Chinese Patent Application No. CN201010577131.8 which claims priority from U.S. Appl. No. 61/265,840, filed Dec. 2, 2009, and captioned U.S. Appl. No. 12/917,276.

* cited by examiner

SECONDARY BATTERY

CROSS-REFERENCE TO RELATED APPLICATION

This application claims the benefit of U.S. Provisional Application No. 61/265,840, filed Dec. 2, 2009 in the U.S. Patent and Trademark Office, the disclosure of which is incorporated herein by reference.

BACKGROUND

1. Field

Aspects of the present invention relate to a secondary battery and, more particularly, to a secondary battery pack with a label sheet.

2. Description of the Related Technology

As the use of portable electronic apparatuses increases, the use of rechargeable secondary batteries increases. Therefore, due to a user's demand, research for implementing a secondary battery which is miniaturized and light in weight is in progress.

Amongst secondary batteries, a lithium (Li) battery has higher operation voltage and energy density per unit weight than a nickel-cadmium (Ni—Cd) battery or a nickel-hydrogen (NI-MH) battery. Therefore, use of the Li battery has increased.

The lithium battery is classified into a lithium-ion battery using a liquid electrolyte and a lithium-polymer battery using a polyelectrolyte. The lithium battery can be manufactured in various types, such as a cylinder type, a prismatic type, a can type, and a pouched type depending on the case type.

The secondary battery generally includes an electrode assembly generating current, and a pouch housing the electrode assembly. The secondary may further include a protection circuit controlling charging and discharging and an exterior material for sealing and protecting the battery.

In recent years, in order to reduce a size and a thickness of the secondary battery, a method of substituting the exterior material with a label sheet has been adopted. However, in this case, since the label sheet can be easily removed, a risk caused by disassembling and modifying the battery may be generated and it is difficult for a service center to recognize when a user has disassembled and modified the battery. Further, when moisture permeates into the second battery, the performance of the secondary battery is deteriorated and the lifespan of the secondary battery is remarkably shortened. Where it is easy for the user to disassemble and modify the secondary battery, it is difficult for the service center to verify whether or not the moisture permeates into the second battery.

SUMMARY

An embodiment of the present invention provides a secondary battery capable of preventing disassembling and modification by a user.

Another embodiment of the present invention provides a secondary battery in which it is possible to easily verify whether or not the second battery was submerged.

According to an aspect of the present invention, a secondary battery includes: a bare cell; a protection circuit module (PCM) electrically connected to the bare cell; a first sheet plated on an exterior of the bare cell; a water permeable second sheet placed on the first sheet; and a submergence label placed between the first sheet and the water permeable second sheet; the submergence label indicating if the bare cell has been exposed to moisture.

According to another aspect of the present invention, the submergence label includes a verification pattern and a substrate.

According to another aspect of the present invention, the verification pattern is formed of aqueous ink.

According to another aspect of the present invention, the verification pattern is configured to change pattern when coming into contact with moisture.

According to another aspect of the present invention, the submergence label is placed directly on the first sheet.

According to another aspect of the present invention, the first sheet is made of a waterproof and insulating resin insulating and protecting the bare cell and the second sheet is made of a moisture permeating resin so that the submergence label indicates whether moisture has permeated into the bare cell.

According to another aspect of the present invention, the second sheet has an opening to expose the submergence label to an exterior of the second sheet.

According to another aspect of the present invention, the second sheet has an opening in form a stripe or mesh exposing the submergence label to an exterior of the second sheet.

According to another aspect of the present invention, the water permeable second sheet completely covers the submergence label.

According to another aspect of the present invention, a secondary battery includes a bare cell; a protection circuit module electrically connected to the bare cell; and a label sheet placed on an exterior surface of the bare cell, wherein the label sheet includes a first impermeable sheet and a second permeable sheet and a label indicating whether moisture has permeated into the bare cell, and the label is bonded to the first impermeable label sheet.

According to another aspect of the present invention, placement of the label on the first impermeable label sheet is related to permeation of the moisture into the bare cell.

According to another aspect of the present invention, the label includes a substrate, of which one surface is attached to the first sheet, and a verification pattern, of which one surface is attached to the substrate.

According to another aspect of the present invention, the verification pattern is formed by aqueous ink and the substrate is formed of paper, plastic or vinyl.

According to another aspect of the present invention, the verification pattern is configured to change pattern when coming into contact with the moisture.

According to another aspect of the present invention, the label includes a verification pattern attached directly onto the first sheet.

According to another aspect of the present invention, the first impermeable label sheet is made of a waterproof and insulating resin insulating and protecting the bare cell and the second permeable label sheet is made of a moisture permeating resin so that the label indicates whether moisture has permeated into the bare cell.

According to another aspect of the present invention, an edge of the substrate is attached to the second sheet or a portion of the verification pattern is attached to the second sheet.

According to another aspect of the present invention, the second sheet has an opening to expose a portion of the verification pattern to an exterior of the second sheet.

According to another aspect of the present invention, the second sheet has an opening in form of a stripe or mesh to expose the verification pattern to the exterior of the second sheet.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
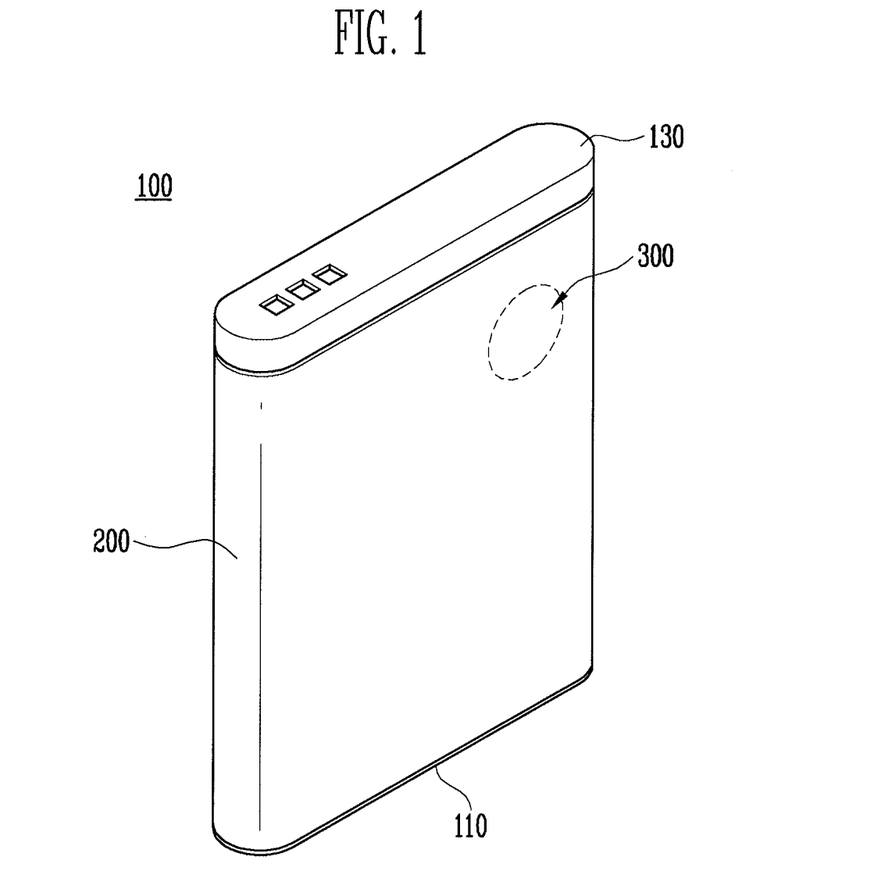
FIG. 1 is a perspective view for describing an embodiment of a secondary battery according to an aspect of the present invention.
Figure 2:
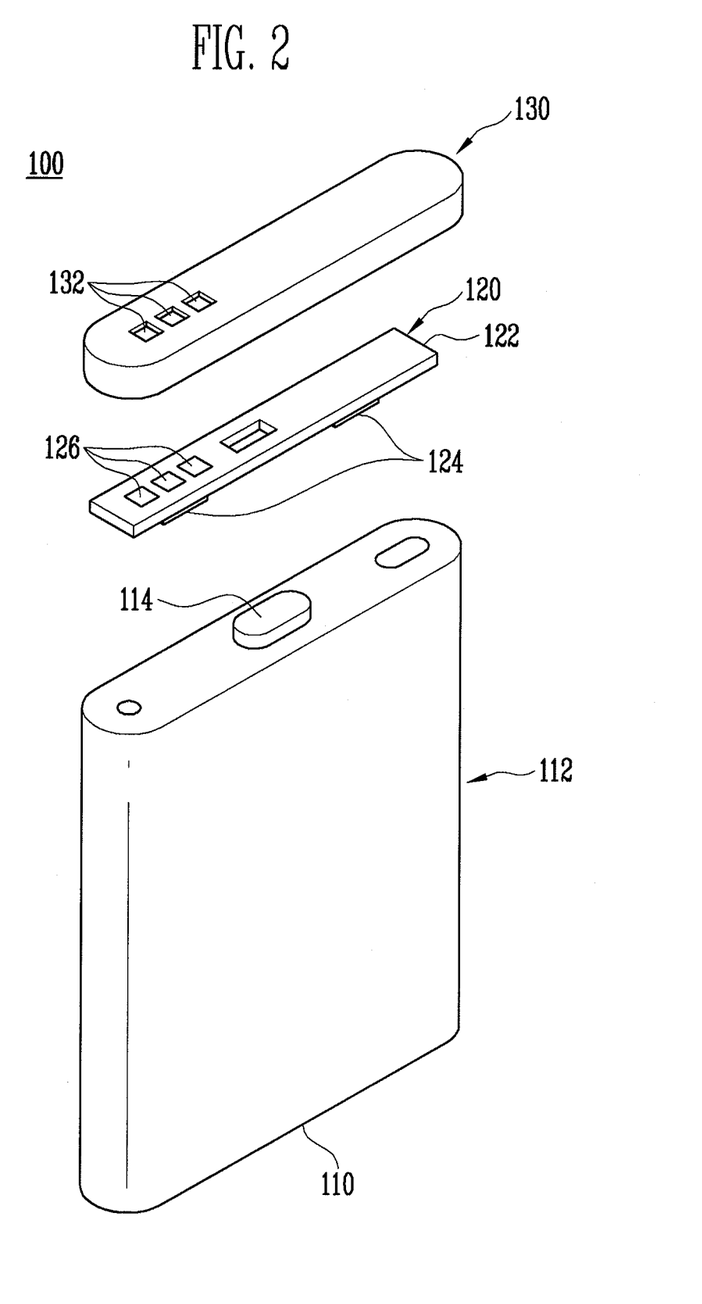
FIG. 2 is an exploded perspective view of a secondary battery according to an aspect of the present invention.

FIGS. 1 and 2 are perspective views for describing a secondary battery 100 according to an aspect of the present invention. Referring to FIG. 1, in the secondary battery 100, an exterior surface of a bare cell 110 is plated with a label sheet 200. A submergence label 300 including a verification pattern 320 is interposed between the exterior surface and the label sheet 200.

Referring to FIG. 2, the secondary battery 100 includes the bare cell 110 generating current, a protection circuit module (PCM) 120 electrically connected with the bare cell 110, and a cover case 130 coupled with the bare cell 110 while covering the PCM 120. The PCM 120 is disposed at one side of the bare cell 110 and may be housed in the cover case 130.

The bare cell 110 includes an electrode assembly (not shown), a can 112 housing the electrode assembly, and an electrode terminal 114. that the electrode terminal 114 is electrically connected with the PCM 120 while being connected with a positive plate or a negative plate of the electrode assembly.

In FIGS. 1 and 2, a prismatic battery 100 have a bare cell 110 is shown. However, the battery 100 and the bare cell 110 may be a cylinder-type or pouched-type battery. Therefore, battery 100 and the bare cell 110 are not limited to the embodiments illustrated in FIGS. 1 and 2.

The PCM 120 includes an insulating substrate 122 such as a printed circuit board (PCB) with a predetermined circuit wiring, etc., a circuit part 124 that is connected to the circuit wiring and protects the bare cell 110 while charging and discharging, and a terminal 126 for charging and discharging the bare cell 110.

A first electrode 114 and a second electrode 112 of the bare cell 110 are electrically connected to the circuit wiring through a wire or a lead tab. The circuit part 124 may include a passive element, an active element, and an integrated circuit IC.

The cover case 130 insulates and protects the PCM 120. The cover case 130 includes an opening 132 for exposing the terminal 126 of the PCM 120 to the outside. Parts of the PCM 120 and the bare cell 110 may be housed in the cover case 130.

Figure 3:
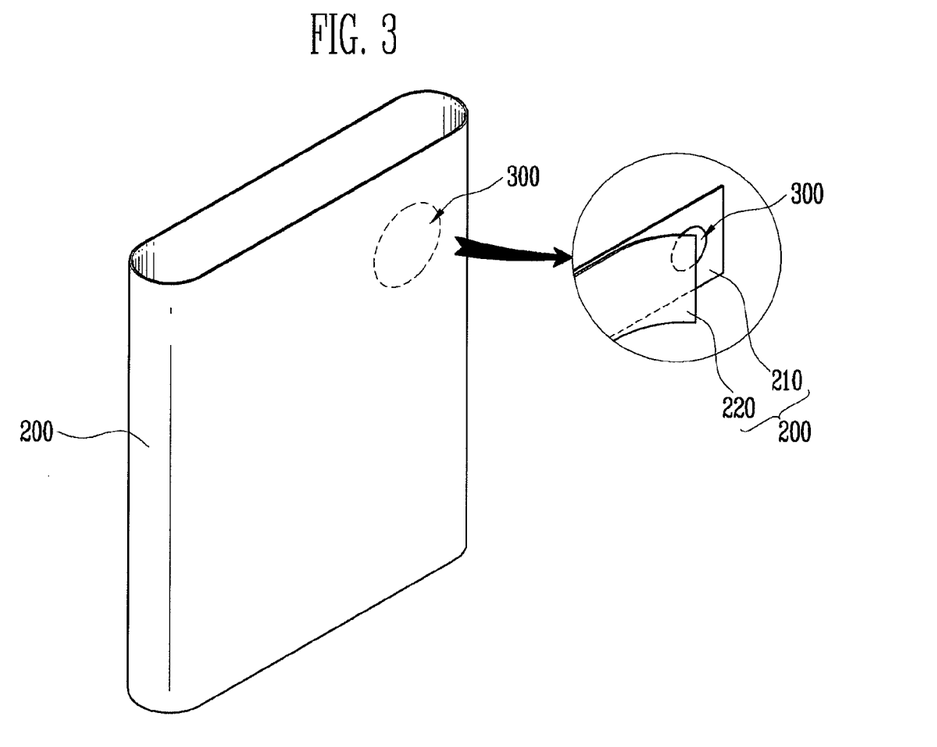
FIG. 3 is a perspective view for describing a label sheet shown in FIG. 1.

Referring to FIGS. 2 and 3, an exterior of the bare cell 110 is plated with the label sheet 200. The label sheet 200 has a film shape to be placed onto the exterior surface of the bare cell 110. The bare cell 100 having the label sheet 200 can be inserted into a case having various forms, such as a tubular form, a cylindrical form, etc.

The label sheet 200 includes a first sheet 210 placed on the exterior surface of the bare cell 110 and a second sheet 220 placed on the first sheet 210. An adhesive may be applied on one surface or both surfaces of the first sheet 210 and one surface of the second sheet 220 placed with the first sheet 210.

Figure 4A:
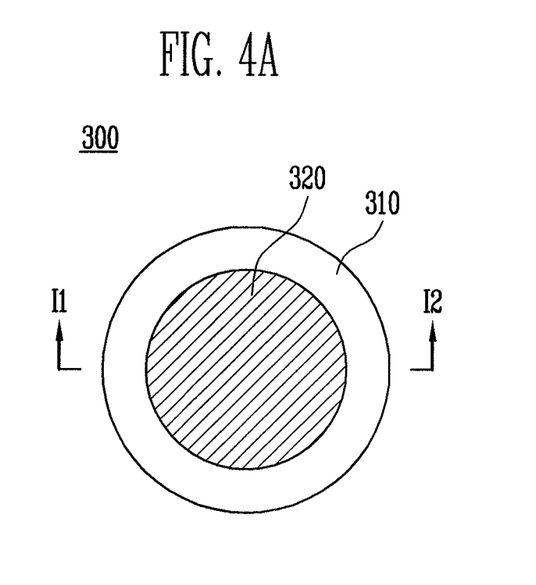
FIG. 4A is a plan view for describing an embodiment of a submergence label shown in FIG. 1.
Figure 4B:
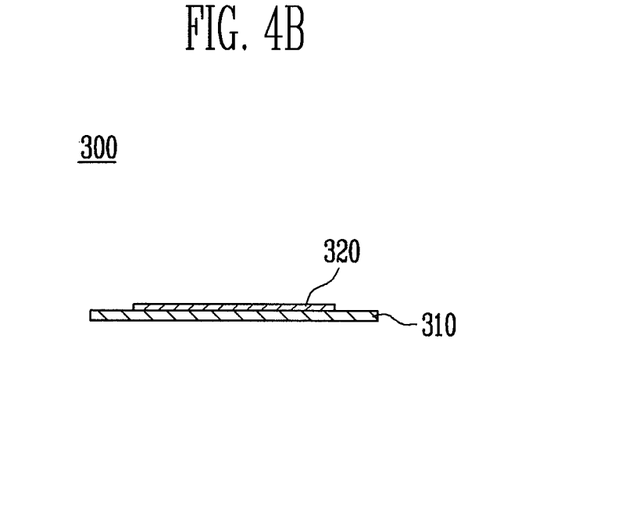
FIG. 4B is a cross-sectional view taken along line I1-I2 of FIG. 4A.

Referring to FIGS. 3, 4A and 4B, the submergence label 300 is interposed at a predetermined part between the first sheet 210 and the second sheet 220. An attachment location of the submergence label 300 is determined as a part that is vulnerable to permeation of moisture in the structure of the bare cell 110 or by considering productivity in a manufacturing process, etc.

The submergence label 300 includes a substrate 310 of which one surface is attached to the first sheet 210 and a submergence verification pattern 320 formed by aqueous ink on the other surface of the substrate 310. The substrate 310 can be made of paper, plastic, or vinyl, but the invention is not limited thereto.

In FIG. 3, the submergence verification pattern 320 has a circular shape, but the submergence verification pattern 320 is not limited to this shape and may have a rectangular, a dot, or mesh shape. Furthermore, although FIG. 3 illustrates only one submergence label 300, many submergence labels may be formed and attached on the bare cell 110.

The submergence verification pattern 320 maintains a predetermined form and a predetermined shape when it does not contact moisture and is configured to have modified forms and shapes when the submergence verification pattern 320 contacts moisture. The submergence verification pattern 320 may be formed, for example, by applying the aqueous ink and may spread or be discolored when it contacts moisture or humidity according to the type of the aqueous ink.

In the shown embodiment, the submergence verification pattern 320 is formed by applying the aqueous ink to the substrate 310. When the submergence verification pattern 320 is formed in a solid state, the submergence verification pattern 320 can instead be attached directly to the first sheet 210 without using any substrate 310. That is, only the submergence verification pattern 320 may be interposed between the first sheet 210 and the second sheet 220.

The first sheet 210 is made of a waterproof and insulating resin for insulating and protecting the bare cell 110. The second sheet 220 is made of a moisture permeating resin. The aqueous pattern 320 spreads or is discolored by moisture passing through the second sheet 220, making it is possible to verify whether or not the secondary battery 100 was submerged. Furthermore, since the moisture passing through the second sheet 220 does not pass through the first sheet 210, the bare cell 110 can be protected from moisture.

Figure 5A:
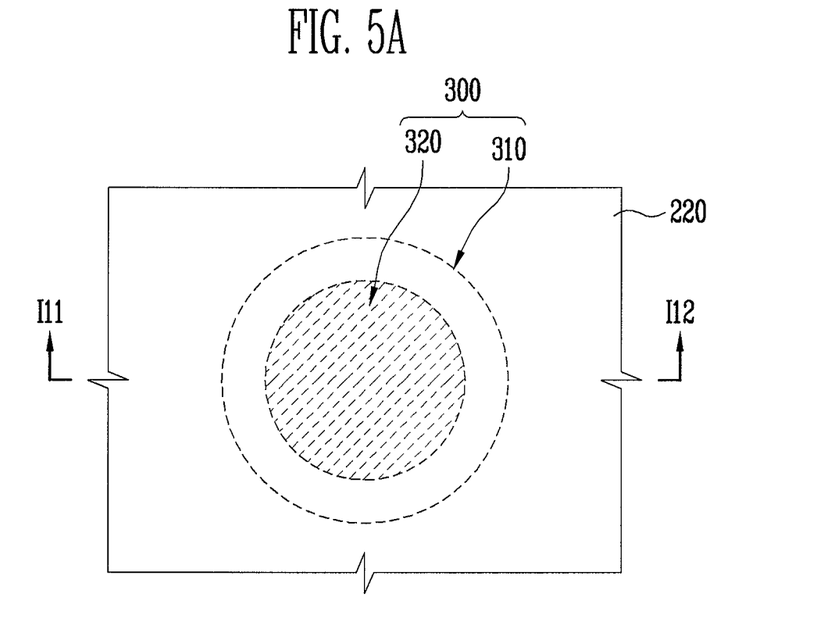
FIG. 5A is a plan view for describing an embodiment of the present invention.
Figure 5B:
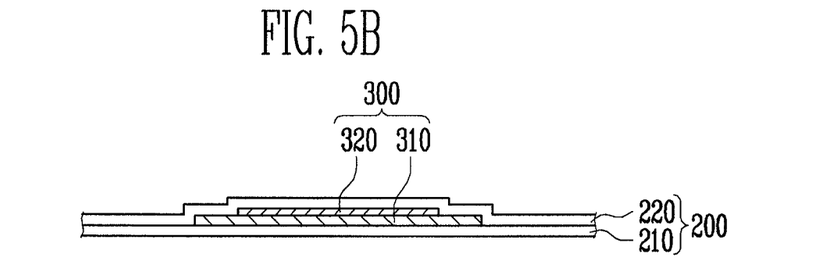
FIG. 5B is a cross-sectional view taken along line I11-I12 of FIG. 5A.

Referring to FIGS. 5A and 5B, a part of the submergence label 300 is attached to the second sheet 220. That is, an edge part of the substrate 310 or/and a part of the submergence verification pattern 320 is placed at the second sheet 220, such that when the second sheet 220 is damaged, the submergence verification pattern 320 is also inevitably damaged, thereby allowing to determine whether or not the bare cell 110 is disassembled. By way of example, the pattern 320 could be bonded to the second sheet 220

Figure 6A:
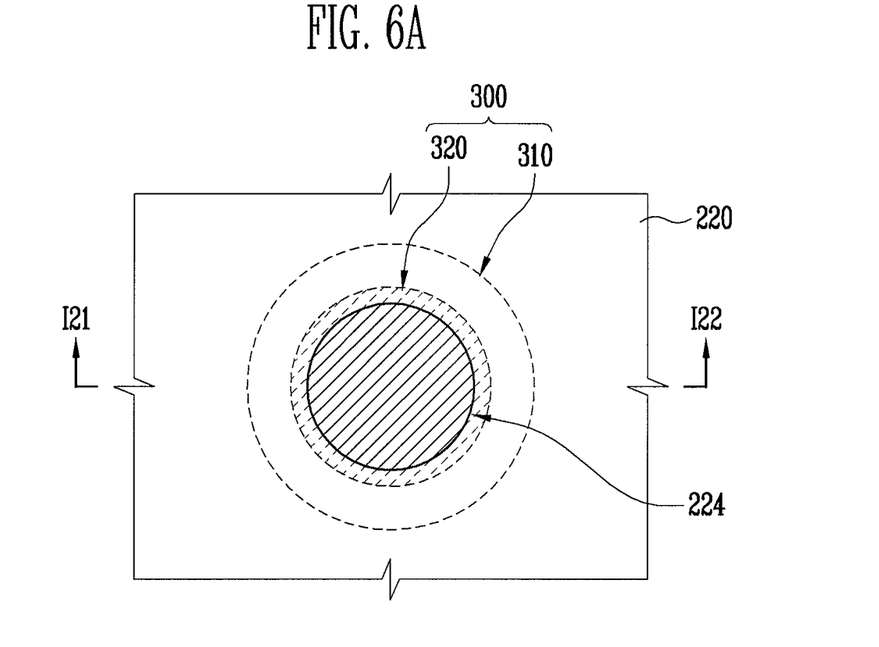
FIG. 6A is a plan view for describing another embodiment of the present invention.
Figure 6B:
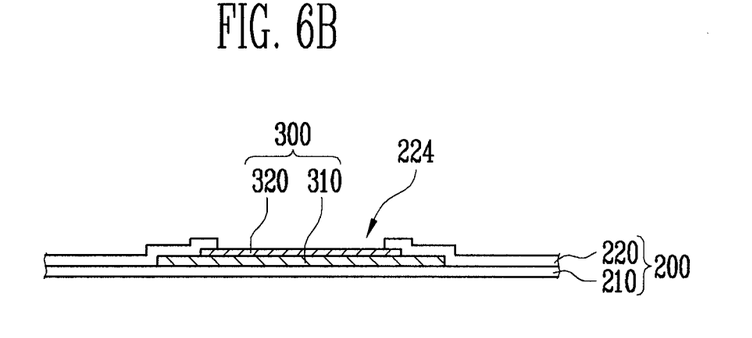
FIG. 6B is a cross-sectional view taken along line I21-I22 of FIG. 6A.

In FIGS. 5A and 5B, the submergence label 300 is airtight sealed when placed between the first sheet 210 and the second sheet 220. However, in another embodiment of the present invention, as shown in FIGS. 6A and 6B, an opening 224 is formed on the second sheet 220 and a part of the submergence label 300. That is, a part of the submergence verification pattern 320 may be exposed through the opening 224. In this case, the edge part of the substrate 310 or/and a part of the submergence verification pattern 320 is placed on the second sheet 220.

A part of the submergence verification pattern 320 is exposed through the opening 224 to directly connect the submergence verification pattern 320 with the external environment. Therefore, it is possible to easily verify whether or not the secondary battery 100 was submerged.

Figure 6C:
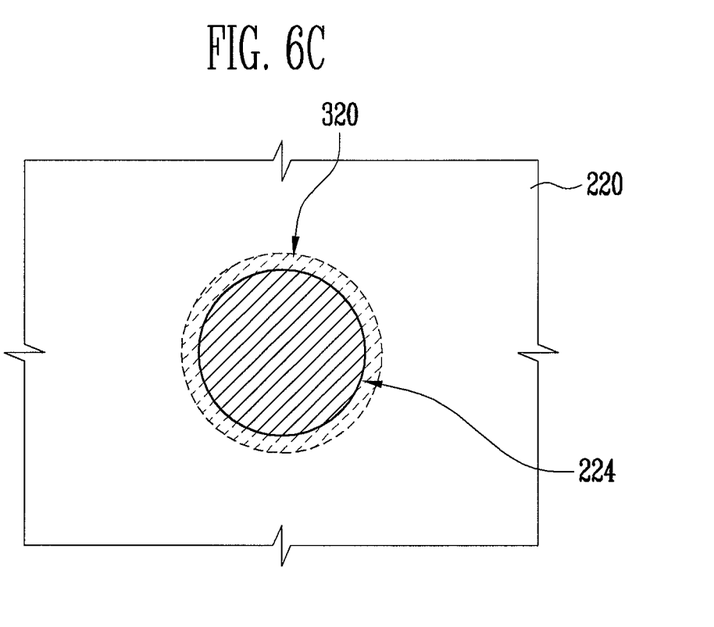
FIG. 6C is a plan view for describing yet another embodiment of the present invention.

Further, as shown in FIG. 6C, the submergence verification pattern 320 having a solid shape as a structure without using a substrate is interposed between the first sheet 210 and the second sheet 220 and a part of the submergence verification pattern 320 can be exposed through the opening 224.

Figure 7A:
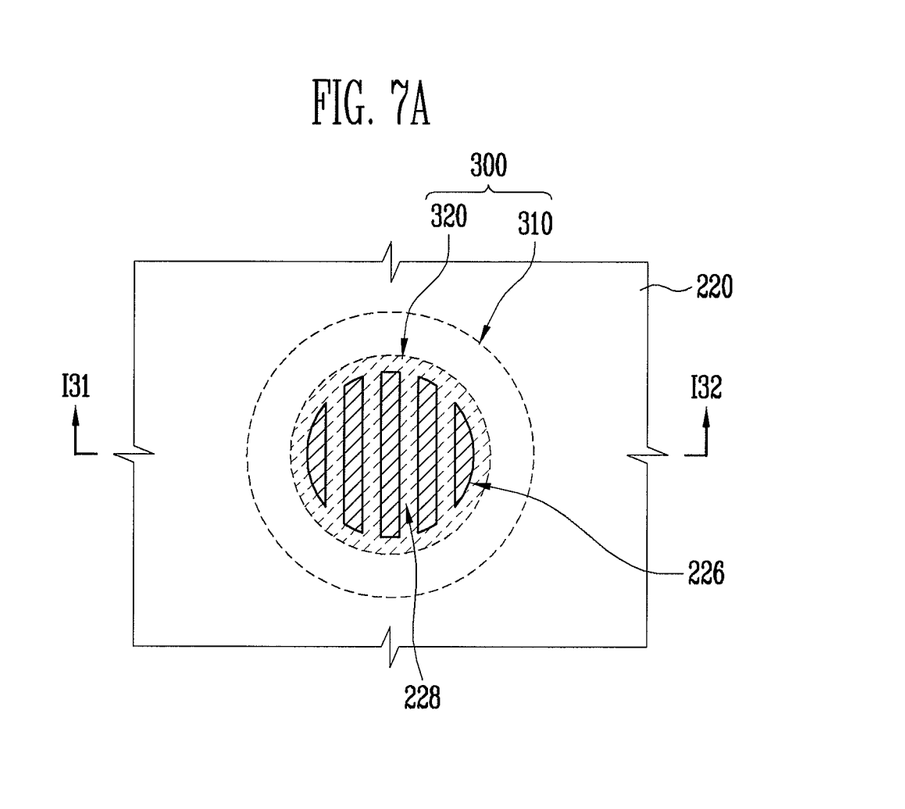
FIG. 7A is a plan view for describing yet another embodiment of the present invention.
Figure 7B:
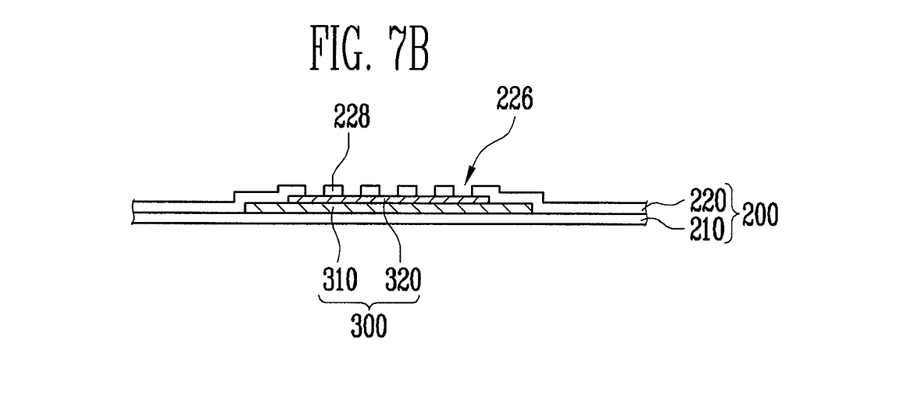
FIG. 7B is a cross-sectional view taken along line I31-I32 of FIG. 7A.

In another embodiment, shown in FIGS. 7A and 7B, multiple openings 226 are formed on the second sheet 220 and a part of the submergence label 300 (that is, a part of the submergence verification pattern 320) can be exposed through the openings 226. A pattern 228 having a stripe or mesh form is formed in the opening 226, such that the submergence verification pattern 228 is bonded to the second sheet 220 to more effectively attach the submergence label 300 to the first and second sheets 210 and 220 while exposing portions through the openings 226.

In the secondary battery of an aspect of the present invention, the exterior surface of the battery is plated with the label sheet. The label sheet has a stacking structure of the first sheet and the second sheet and since the sheets are placed one on top of another, disassembling is not easy and even though disassembling is possible, it is difficult to restore the sheets to the original state.

Further, the secondary battery of an aspect of the present invention includes the submergence verification pattern for verifying whether or not the secondary battery is submerged. The submergence verification pattern is interposed between the first sheet and the second sheet and as noted above, since the first sheet and the second sheet are placed one on top of another, it is not easy to disassemble and restore the sheets to their original state.

Accordingly, it is possible to prevent damage caused by a user disassembling or modifying, or reusing the battery and it is possible to easily verify whether or not the secondary battery has been submerged due to user's carelessness or mistake.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery comprising:
    a bare cell;
    a protection circuit module (PCM) electrically connected to the bare cell;
    a can accommodating the bare cell;
    a first sheet formed on an exterior surface of the can;
    a water permeable second sheet placed on the first sheet; and
    a submergence label placed between the first sheet and the water permeable second sheet, the submergence label indicating whether the bare cell has been exposed to moisture,
    wherein the second sheet has an opening to expose the submergence label to the environment,
    wherein the submergence label includes a verification pattern and a substrate,
    wherein an edge of the substrate and an edge of the verification pattern are respectively attached to the second sheet,
    wherein the submergence label is farther from the bare cell than the exterior surface of the can, and
    wherein the submergence label is further configured to indicate whether the exterior of the can has been exposed to moisture.

2. The secondary battery according to claim 1, wherein the verification pattern is formed of an aqueous ink.

3. The secondary battery according to claim 1, wherein the verification pattern is configured to change pattern when coming into contact with moisture.

4. The secondary battery according to claim 1, wherein the first sheet is made of a waterproof and insulating resin insulating and protecting the bare cell and the second sheet is made of a moisture permeating resin so that the submergence label indicates whether moisture has permeated into the bare cell.

5. The secondary battery according to claim 1, wherein the opening is in the form of a stripe or mesh.

6. A secondary battery comprising:
    a bare cell;
    a protection circuit module electrically connected to the bare cell;
    a can accommodating the bare cell;
    a label sheet placed on an exterior surface of the can,
    wherein the label sheet includes a first impermeable sheet, a second permeable sheet, and a label indicating whether moisture has permeated into the bare cell, and the label is bonded to the first impermeable label sheet,
    wherein the label includes a substrate having one surface attached to the first sheet and a verification pattern having one surface attached to the substrate, wherein the second sheet has an opening to expose a portion of the verification pattern to the environment, wherein the label is farther from the bare cell than the exterior surface of the can, and wherein the label is further configured to indicate whether the exterior of the can has been exposed to moisture,
    wherein an edge of the substrate is attached to the second sheet and an edge the verification pattern is attached to the second sheet.

7. The secondary battery according to claim 6, wherein placement of the label on the first impermeable label sheet is related to permeation of the moisture into the bare cell.

8. The secondary battery according to claim 6, wherein the verification pattern is formed by aqueous ink and the substrate is formed of paper, plastic or vinyl.

9. The secondary battery according to claim 6, wherein the verification pattern is configured to change pattern when coming into contact with the moisture.

10. The secondary battery according to claim 6, wherein the first impermeable label sheet is made of a waterproof and insulating resin insulating and protecting the bare cell, and the second permeable label sheet is made of a moisture permeating resin so that the label indicates whether moisture has permeated into the bare cell.

11. The secondary battery according to claim 6, wherein the opening is in the form of a stripe or mesh.

\* \* \* \* \*

UNITED STATES PATENT AND TRADEMARK OFFICE
CERTIFICATE OF CORRECTION

PATENT NO. : 9,017,835 B2
APPLICATION NO. : 12/917276
DATED : April 28, 2015
INVENTOR(S) : Se-Sub Sim It is certified that error appears in the above-identified patent and that said Letters Patent is hereby corrected as shown below:

Specification

In column 3 at line 61, change "terminal 114." to --terminal 114,--.

In column 5 at line 14, change "220" to --220.--.

Claims

In column 6 at line 63, Claim 6, change "edge the" to --edge of the--.

Signed and Sealed this
Twelfth Day of July, 2016

Michelle K. Lee
*Director of the United States Patent and Trademark Office*